United States Patent
Ranade

(10) Patent No.: US 10,864,811 B2
(45) Date of Patent: Dec. 15, 2020

(54) TOROIDAL TRANSMISSION SYSTEM FOR HYBRID VEHICLES

(71) Applicant: Atul A. Ranade, Navi Mumbai (IN)

(72) Inventor: Atul A. Ranade, Navi Mumbai (IN)

(*) Notice: Subject to any disclaimer, the term of this patent is extended or adjusted under 35 U.S.C. 154(b) by 644 days.

(21) Appl. No.: 15/562,179

(22) PCT Filed: Apr. 8, 2016

(86) PCT No.: PCT/IB2016/052001
§ 371 (c)(1),
(2) Date: Sep. 27, 2017

(87) PCT Pub. No.: WO2016/162840
PCT Pub. Date: Oct. 13, 2016

(65) Prior Publication Data
US 2018/0105030 A1    Apr. 19, 2018

(30) Foreign Application Priority Data
Apr. 10, 2015   (IN) .......................... 1506/MUM/2015

(51) Int. Cl.
| | |
|---|---|
| *B60K 6/36* | (2007.10) |
| *F16H 15/38* | (2006.01) |
| *F16H 37/06* | (2006.01) |
| *B60K 6/48* | (2007.10) |
| *B60K 6/543* | (2007.10) |

(52) U.S. Cl.
CPC .................. *B60K 6/36* (2013.01); *B60K 6/48* (2013.01); *B60K 6/543* (2013.01); *F16H 15/38* (2013.01); *F16H 37/065* (2013.01); *B60K 2006/4825* (2013.01); *Y02T 10/62* (2013.01)

(58) Field of Classification Search
CPC .. B60K 6/36; B60K 6/48; B60K 6/543; F16H 37/065
See application file for complete search history.

(56) References Cited

U.S. PATENT DOCUMENTS 5,230,670 A * 7/1993 Hibi ...................... F16H 37/022
475/214
5,308,297 A * 5/1994 Greenwood ............ F16H 15/38
476/10

(Continued)

FOREIGN PATENT DOCUMENTS

| WO | 2012024225 A1 | 2/2012 |
| WO | 2014078583 A1 | 5/2014 |
| WO | 2016162840 A1 | 10/2016 |

OTHER PUBLICATIONS

International Search Report for International Patent Application No. PCT/IB2016/052001, dated Jan. 7, 2016, 3 pages.

*Primary Examiner* — David M Fenstermacher
(74) *Attorney, Agent, or Firm* — Ditthavong & Steiner, P.C.

(57) ABSTRACT

A toroidal type continuously variable transmission system is disclosed. The system comprises a plurality of input disks (124 & 126) and at least one output disk (128), which are arranged noncoaxially; and a plurality of tiltable rollers (136, 138 & 140) for operatively coupling the input disks (124 & 126) and the output disk (128) for transmitting the torque. The transmission system is adapted to be operated by the torque transmitted by at least one of the plurality of input disks (124 & 126) to the at least one output disk (128).

10 Claims, 1 Drawing Sheet

(56) References Cited

U.S. PATENT DOCUMENTS

| | | | | |
|---|---|---|---|---|
| 6,110,070 | A * | 8/2000 | Nagai | F16H 57/043 |
| | | | | 184/6.12 |
| 7,503,869 | B2 * | 3/2009 | Nishizawa | F16H 61/6648 |
| | | | | 476/10 |
| 7,625,309 | B2 * | 12/2009 | Fuller | F16H 37/086 |
| | | | | 476/10 |
| 2003/0078133 | A1 * | 4/2003 | Kobayashi | F16H 61/6649 |
| | | | | 476/40 |
| 2006/0223667 | A1 * | 10/2006 | Nakazeki | F16H 37/021 |
| | | | | 476/42 |
| 2009/0023545 | A1 * | 1/2009 | Beaudoin | F16H 61/6648 |
| | | | | 476/42 |
| 2013/0130863 | A1 * | 5/2013 | Xu | F16H 55/34 |
| | | | | 476/42 |

* cited by examiner

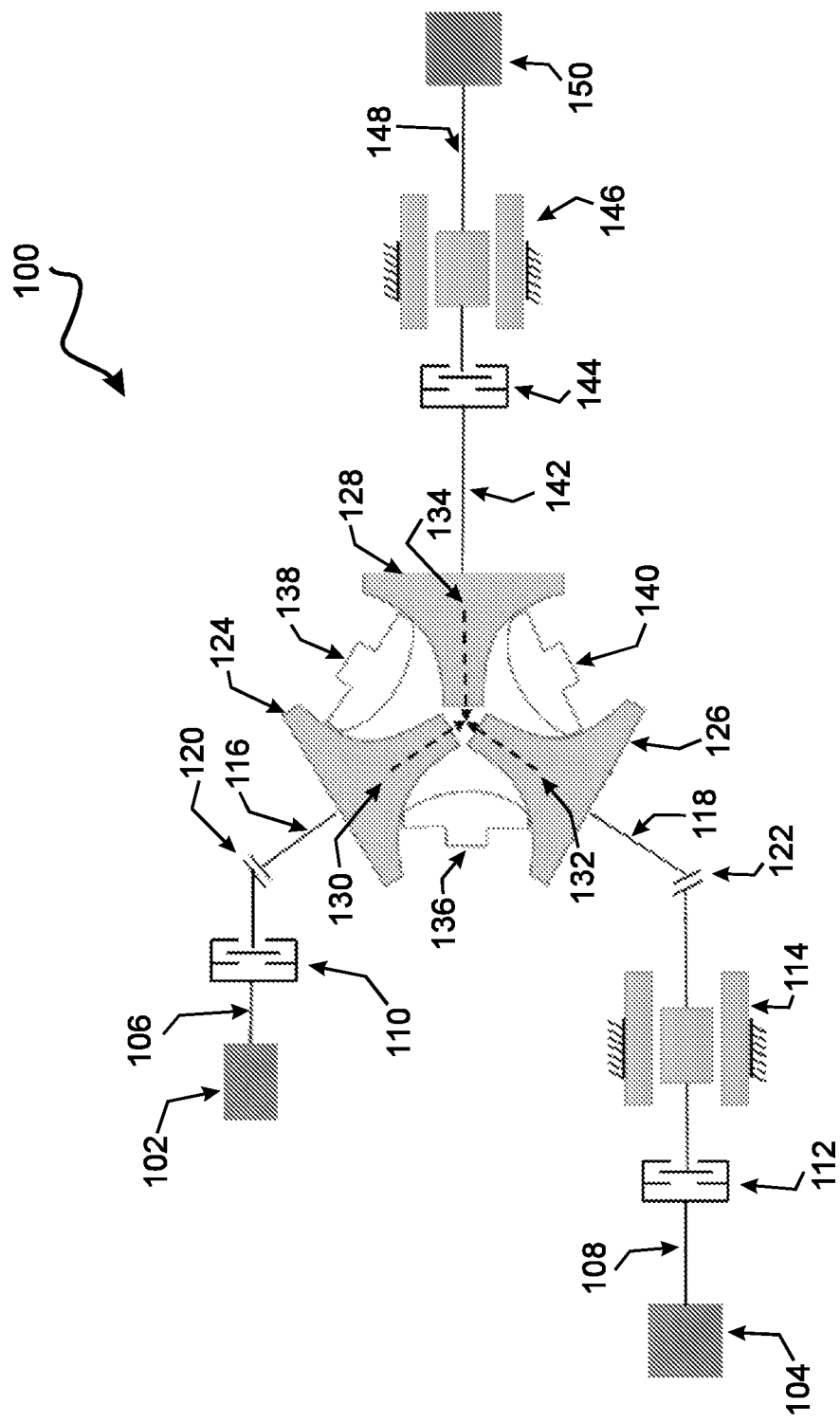

TOROIDAL TRANSMISSION SYSTEM FOR HYBRID VEHICLES

CROSS-REFERENCES TO RELATED APPLICATIONS

This application claims priority from a PCT Application Serial No. PCT/IB2016/052001, entitled "TOROIDAL TRANSMISSION SYSTEM FOR HYBRID VEHICLES," filed on Apr. 8, 2016, which claims priority from an Indian Patent Application Serial No. 1506/MUM/2015, entitled "TOROIDAL TRANSMISSION SYSTEM FOR HYBRID VEHICLES," filed on Apr. 10, 2015, the contents of which are hereby incorporated herein in their entirety by this reference.

FIELD OF THE INVENTION

The present invention relates to a continuously variable transmission system. Particularly, the present invention relates to a toroidal type continuously variable transmission system for hybrid vehicles.

BACKGROUND

A transmission system is usually a gearbox for providing speed and torque conversions from a rotating power source to another device, and commonly includes clutch and drive shafts. The most typical use of the transmission system is in vehicles, where the transmission adapts the output of the internal combustion engine to drive the wheels. Other common uses of the transmission system are in machines for industrial, construction, agricultural, mining or other automotive applications. These transmission systems are designed with a set of fixed gear ratios; and the transmission shifts in step-wise manner between these finite gear ratios.

To overcome this drawback, continuously variable transmission systems have been developed, which can change seamlessly through an infinite number of effective gear ratios between a maximum gear ratio and a minimum gear ratio. These systems provide the benefit of changing the transmission ratio continuously, without jerking.

A typical toroidal type continuously variable transmission comprises a toroidally-recessed input disk connected to an input drive shaft and a toroidally-recessed output disk arranged coaxially with respect to the input disk. A plurality of rollers (generally three rollers) is provided in the toroidal cavity defined between the input and output disks and power is transmitted from the input disk to the output disk by means of the rollers.

The rollers remain frictionally engaged with the input and output disks. For changing the gear ratio or doing a gear shift, the rollers are turned around the respective shafts to change frictional contact points against each disk.

Such transmissions are mainly designed for use in relatively high power, high torque applications. In order to be able to handle the levels of power and torque and to provide a more balanced transmission, it is preferable to utilize a pair of input disks and a pair of coaxially mounted output disks, defining two toroidal cavities, each of which encloses three rollers.

In case of hybrid vehicles, these traditional continuously variable transmission systems need to be adapted to receive power from multiple sources. The application of the continuously variable transmission system in hybrid vehicles requires that the output of both electric motor and internal combustion engine be used for driving the wheels. Generally, the electric motor supplies a limited amount of power which is used to drive the vehicle at lower speeds, whereas, at higher speeds power from the internal combustion engine is used. Additionally, usually a common input shaft is provided which connects to the electric motor and the combustion engine. Thus, such transmission systems are designed such that the engine and the electric motor are both always driven at the same RPM. This fundamentally compromises the efficiency of the transmission system as both these power sources generate their maximum torques at different RPM's. Hence, in the traditional designs only one of the power sources can be producing its maximum torque at any given point.

Also, the state of art technologies provide a different transmission design for a fully hybrid vehicle which requires more than one electric motor and an auxiliary combustion engine. This is a complicated and costly design which is not compatible with the other mild hybrid vehicles.

There is therefore felt a need to provide an improved continuously variable transmission system which will overcome at least partially the above-mentioned drawbacks in the prior art.

SUMMARY OF THE INVENTION

Accordingly, a primary object of the present invention is to provide a toroidal type continuously variable transmission system which can simultaneously receive torque at different RPM from more than one power sources, viz., the internal combustion engine and the electric motor, thereby making the transmission system suitable for all kinds of hybrid vehicles, enabling different gear ratios simultaneously for the internal combustion engine and the electric motor, and giving improved performance and fuel efficiency.

Another object of the present invention is to provide a continuously variable transmission system which is adapted to give brake energy regeneration even while driving on the electric motor when the combustion engine is shut off, and continuously while braking.

Yet another object of the present invention is to provide a continuously variable transmission system which is adapted to provide an all-wheel drive.

An additional object of the present invention is to provide a continuously variable transmission system which has a simple construction and is economical.

Other objects, aspects and advantages of the present invention will be more apparent from the following description.

Accordingly, the present invention discloses a toroidal transmission system for hybrid vehicles, comprising:
- a plurality of input disks positioned noncoaxially and rotatably mounted on plurality of input shafts for receiving torque from more than one power source;
- at least one output disk positioned noncoaxially with said plurality of input disks in a configuration adapted to receive the torque, said at least one output disk being rotatably mounted on at least one output shaft for transmitting the torque to a drive mechanism; and
- a plurality of tiltable rollers disposed in the space between two adjacent disks including an input disk-output disk, an input disk-input disk and an output disk-output disk, said plurality of tiltable rollers being configured for operatively coupling at least a part of the noncoaxial configuration of said plurality of input disks and said at least one output disk to transmit the torque therebetween;

wherein, said toroidal transmission system is adapted to be operated by torque transmitted by at least one of said plurality of input disks to said at least one output disk;
at least one of said plurality of input disks is adapted to be configured as said output disk; and
said plurality of tiltable rollers are adapted to control the gear ratios between said adjacent disks such as to independently control the torque generated and transmitted by said adjacent disks.

The said power source includes more than one power sources selected from internal combustion engine, electric motor, fuel cell, compressed air engine, high mass flywheel, and the like.

Preferably, bevel gears are mounted on said plurality of input shafts between connecting shafts.

Additionally, first clutch means are provided on each of said plurality of input shafts for selectively connecting said power source to said plurality of input disks. Furthermore, second clutch means are provided on said at least one output shaft for selectively connecting said toroidal transmission system to said drive mechanism. Preferably, said second clutch means can be provided on said at least one output shaft between said power source and said drive mechanism. Additionally, an auxiliary power source can be provided in operative communication with said at least one output shaft subsequent to said second clutch means for transmitting additional torque to said at least one output shaft.

The said drive mechanism can be a differential arrangement. The said drive mechanism shall be provided in operative communication with at least one set of wheels from front wheels and rear wheels. In accordance with the present invention, for an all-wheel drive at least one disk from said plurality of input disks and said at least one output disk can be operatively connected to said front wheels and at least one disk from said plurality of input disks and said at least one output disk can be operatively connected to said rear wheels.

BRIEF DESCRIPTION OF THE DRAWING

The invention will now be described with the help of the following drawing, in which, FIG. 1 illustrates a schematic of a preferred embodiment of the toroidal transmission system in accordance with the present invention.

DETAILED DESCRIPTION OF THE INVENTION

The embodiments herein and the various features and advantageous details thereof are explained with reference to the non-limiting examples in the following description. The examples used herein are intended merely to facilitate an understanding of the ways in which the embodiments herein may be practiced and to further enable those of skill in the art to practice the embodiments herein. Accordingly, the examples should not be construed as limiting the scope of the embodiments herein.

The description herein after, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The present invention envisages a toroidal type continuously variable transmission system for hybrid vehicles. The transmission system of the present invention is adapted to drive the vehicle as a parallel hybrid, series hybrid and series-parallel hybrid. The transmission system provides a novel disk configuration to allow selective transfer of torque between the input disks and the output disks. The transmission is designed to split the engine power between different functions such as driving the vehicle and recharging batteries.

The toroidal transmission system of the present invention includes a plurality of input disks and at least one output disk, where the plurality of input disks and the at least one output disk are positioned noncoaxially. Each of the input disks are rotatably mounted on an input shaft for receiving torque from a respective power source. The power sources include an internal combustion engine, electric motor, fuel cell, compressed air engine, high mass flywheel, and the like. The output disk receives torque from the input disks. The output disk is rotatably mounted on an output shaft for transmitting the torque. The transmission system further comprises a plurality of tiltable rollers which are disposed in the space (toroidal cavity) between two adjacent disks. The tiltable rollers are provided in each toroidal cavity, viz., between the input disk and output disk, the input disk and input disk and the output disk and output disk. The tiltable rollers are configured for operatively coupling the noncoaxial configuration of the input disks and the output disk to transmit the torque therebetween.

The toroidal transmission system of the present invention is adapted to be operated by torque transmitted by at least one of the plurality of input disks to the output disk. Furthermore, at least one of the plurality of input disks can be configured as the output disk. And, the plurality of tiltable rollers are adapted to control the gear ratios between the adjacent disks such as to independently control the torque generated and transmitted by the disks.

Referring to FIG. 1 of the accompanying drawings, there is disclosed a preferred embodiment of the present invention, the embodiment being generally referenced by the numeral 100. The embodiment 100 illustrates a toroidal transmission system comprising a first input disk 124, a second input disk 126 and an output disk 128. The three disks (124, 126 & 128) are arranged noncoaxially in the configuration, as seen in the embodiment 100. The axes of the three disks intersect at a central point as indicated in the embodiment 100. The two input disks (124 & 126) are mounted on input shafts 116 & 118, respectively. The first input shaft 116 transfers torque to the first input disk 124. A first bevel gear 120 is provided between connecting shafts 106 and 116 as shown. Other alternate means may be used in placed of the bevel gear. The first input shaft 116 operatively connects to the internal combustion engine 102 through the shaft 106. The internal combustion engine 102 is connected to the fuel tank (not shown in FIGURE). The first input disk 124 is adapted to rotate about the axis 130 by the torque received from the internal combustion engine 102 via the first input shaft 116. A first clutch means 110 is provided on the shaft 106 for selectively engaging and disengaging the internal combustion engine 102 and the first input shaft 116.

The second input shaft 118 operatively connects to the first electric motor 114 via shaft 108 to transfer the torque thereof to the second input disk 126. The first electric motor 114 receives energy from the battery (not shown in FIGURE). The second input disk 126 is adapted to rotate about the axis 132 by the torque received from the first electric motor 114 via the second input shaft 118. A second bevel gear 122 is provided between the connecting shafts 108 and 118 as shown. The first electric motor 114 is operatively connected to a first drive mechanism 104, typically a rear differential arrangement, which is adapted to drive the rear wheels, through the shaft 108. The second input shaft 118 may be adapted to function as an output shaft for driving the rear wheels in an all-wheel drive operation. A first of a second clutch means 112 is provided on the shaft 108 for selectively engaging and disengaging the first electric motor 114 and the first drive mechanism 104.

A first tiltable roller 136 is provided between the first input disk 124 and the second input disk 126, such that the circular edges of the first tiltable roller 136 are operatively movably coupled with the surfaces of the first input disk 124 and the second input disk 126 to transmit torque between the input disks. The gear ratios between the first input disk 124 and the second input disk 126 can be varied by the tilt of the first tiltable roller 136 with respect to the axes 130 & 132. The gear ratio is varied by the movement of the first tiltable roller 136, where the first tiltable roller 136 can be tilted in a way that the circular edge of the first tiltable roller 136 in contact with the first input disk 124 is more proximal to the first input disk 124 with respect to the axis 130 than the circular edge of the first tiltable roller 136 in contact with the second input disk 126 with respect to the axis 132, or vice versa. More the proximity of the first tiltable roller 136 with the axes 130 & 132 the greater their speed of rotation.

The output disk 134 is mounted about the output shaft 142. For most applications the output disk 134 is the driven disk. The output disk 134 is adapted to rotate about the axis 134 by the torque received from the input disks 124 & 126. The torque is then transmitted to the output shaft 142. A second tiltable roller 138 is provided between the first input disk 124 and the output disk 128, such that the circular edges of the second tiltable roller 138 are operatively movably coupled with the surfaces of the first input disk 124 and the output disk 128 to transmit torque from the input disk to the output disk. Likewise, a third tiltable roller 140 is provided between the second input disk 126 and the output disk 128, such that the circular edges of the third tiltable roller 140 are operatively movably coupled with the surfaces of the second input disk 126 and the output disk 128 to transmit torque from the input disk to the output disk. The second tiltable roller 138 and the third tiltable roller 140 are adapted to function similar to the first tiltable roller 136 as discussed above. The gear ratios between the first input disk 124 and the output disk 128, and the second input disk 126 and the output disk 128 are varied in a similar manner as that explained above for the two input disks 124 & 126. The tiltable rollers 136, 138 & 140 can be controlled independently. That is, all the three tiltable rollers 136, 138 & 140 can be positioned at different tilt in order to achieve different gear ratios between the three disks 124, 126 & 128.

The embodiment 100 teaches providing a second electric motor 146 about the output shaft 142. The second electric motor 146 also receives energy from the battery (not shown in FIGURE). The output shaft 142 is configured to operate at a torque equal to cumulation of the respective torques from the first input disk 124 and the second input disk 126. A second of the second clutch means 144 is provided on the output shaft 142 for selectively engaging or disengaging the output disk 128, thereby the transmission system. The second electric motor 146 is operatively connected to a second drive mechanism 150, typically a front differential arrangement, which is adapted to drive the front wheels, through shaft 148. The shaft 148 is adapted to function as an output shaft for driving the front wheels. The second electric motor 146 provides additional torque to the second drive mechanism 150, i.e., the second electric motor 146 acts as an auxiliary power source.

Alternatively, the embodiment of the present invention may comprise more than three disks, where all the disks can be operatively coupled in a similar manner by means of tiltable rollers to transmit the torque.

The working of the present invention will now be explained with respect to the exemplary embodiment 100 which shall not be construed to limit the scope and ambit of the invention.

I) Series, Parallel and Series-Parallel Mode of Operation:

In series hybrid operation, the transmission is to be equipped with the internal combustion engine 102, the first electric motor 114 and the second electric motor 146. The first electric motor 114 will be used as generator and the second electric motor 146 will be used as motor. In this mode of operation, the first clutch means 110 is engaged transferring the torque from internal combustion engine 102 to the first input disk 124. The tiltable rollers 136 & 138 transfer the torque from the first input disk 124 to the second input disk 126 and the output disk 128. In this case the second clutch means 112 & 144 are disengaged. Hence, the energy from the internal combustion engine 102 is not used to drive the wheels. The energy from the internal combustion engine 102 is used only to drive the first electric motor 114 which acts as a generator. The first electric motor 114 charges the batteries. The second electric motor 146 draws the energy from the batteries and drives the vehicle.

In parallel hybrid operation (without 4×4 operation), both the first clutch means 110 and the second of the second clutch means 144 are engaged. The first of the second clutch means 112 is disengaged. The energy from the internal combustion engine 102 is transferred to the first input disk 124 through the first clutch means 110. The energy from the first electric motor 114 is transferred to the second input disk 126. The torque from both the input disks is transferred to the output disk 128 via the tiltable rollers 138 & 140. Also, the tiltable rollers 138 & 140 can be adjusted independently in order to set the desired gear ratios between the disks. The torque from the output disk 128 is transferred through the output shaft 142 and the second of the second clutch means 144. The shaft 148 receives the torque from the output shaft 142 and the second electric motor 146. Thus, the energy from all the power sources is delivered to the second drive mechanism 150 which drives the wheels.

In series-parallel operation, the first electric motor 114 acts as a generator and the second electric motor 146 acts as a motor. In this mode of operation, the first clutch means 110 and the second of the second clutch means 144 are engaged. The first of the second clutch means 112 is disengaged. The energy from the internal combustion engine 102 is transferred to the first input disk 124 through the first clutch means 110. The first input disk 124 drives the second input disk 126 and the output disk 128. The ratio of power split from the internal combustion engine 102 to the second input disk 126 and the output disk 128 is achieved by setting the desired gear ratio between the input disks 124 & 126 and gear ratio between the first input disks 124 and the output disk 128. The second input disk 126 drives the first electric motor 114 which recharges the batteries. The torque from the output disk 128 is transferred through the output shaft 142 and the second of the second clutch means 144. The second electric motor 146 draws electric energy from the battery at the same time and drives the shaft 148. Thus, the energy from the internal combustion engine 102 received via the first input disk 124 and the output disk 128 is combined with the power output from second electric motor 146 on the shaft 148 which further drives the vehicle. Alternatively, the first electric motor 114 can also be used as motor and the second electric motor 146 as generator for achieving the series-parallel mode of operation.

II) 4×4 Operation:

In order to obtain an all-wheel drive, the torque must be delivered to the front wheels and the rear wheels. Hence, the second clutch means 112 & 144 both are engaged. In this mode of operation, if the torque from the electric motors is high then the first clutch means 110 is disengaged. Hence, the internal combustion engine 102 is not used. However, if the torque from the electric motors is low then the first clutch means 110 is engaged and the internal combustion engine 102 is turned on. If both the front and rear wheels need to be driven with the same torque then the tilt of the roller 140 is such that the second input disk 126 and the output disk 128 rotate at the same speed, thereby uniformly providing the torque to both the first drive mechanism 104 and the second drive mechanism 150. The rollers 136 and 138 are adjusted symmetrically as well in order to provide the torque from the internal combustion engine 102 uniformly to the second input disk 126 and the output disk 128. For a different torque ratio, the roller 140 can be adjusted accordingly. The rollers 136 and 138 are adjusted as well in the similar manner. Thus, a 4×4 operation with continuously varying torque distribution can be achieved between the front and rear differential arrangements.

III) Regenerative Braking:

Regenerative braking can be achieved with greater flexibility using the present invention. For regenerative braking, the first electric motor 114 or the second electric motor 146 or both can be used. When the second electric motor 146 is used for regenerative braking, the clutch means 110, 112 & 144 are not required to be engaged. The kinetic energy of the vehicle is transferred to the second electric motor 146 via the second drive mechanism 150 and the shaft 148. The second electric motor 146 is then used as generator to utilize the kinetic energy and charge the batteries. If the first electric motor 114 and the second electric motor 146 both are used for regenerative braking then the second of the second clutch means 144 is to be engaged. The first clutch means 110 and the first of the second clutch means 112 are disengaged. The kinetic energy is transferred to the second electric motor 146 via the second drive mechanism 150 and the shaft 148. Also, the same kinetic energy is transferred to the output disk 128. The roller 140 is adjusted to achieve desired speed of the second input disk 126 which then drives the first electric motor 114. Thus, the kinetic energy of the vehicle is used by both the first electric motor 114 and the second electric motor 146 to charge the batteries. The tilt of the roller 140 can be adjusted in order to drive the first electric motor 114 faster or slower based on the speed of the vehicle and the charging current required to be generated. This provides the flexibility of charging the batteries at high and low vehicle speeds.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

Embodiment of the present invention is applicable over a wide number of uses and other embodiments may be developed beyond the embodiment discussed heretofore. Only the most preferred embodiments and their uses have been described herein for purpose of example, illustrating the advantages over the prior art obtained through the present invention; the invention is not limited to these specific embodiments or their specified uses. Thus, the forms of the invention described herein are to be taken as illustrative only and other embodiments may be selected without departing from the scope of the present invention. It should also be understood that additional changes and modifications, within the scope of the invention, will be apparent to one skilled in the art and that various modifications to the composition described herein may fall within the scope of the invention.

The invention claimed is:

1. A toroidal transmission system for hybrid vehicles, comprising:
    a plurality of input disks positioned noncoaxially and rotatably mounted on plurality of input shafts for receiving torque from more than one power source;
    at least one output disk positioned noncoaxially with said plurality of input disks in a configuration adapted to receive the torque, said at least one output disk being rotatably mounted on at least one output shaft for transmitting the torque to a drive mechanism; and
    a plurality of tiltable rollers disposed in the space between two adjacent disks including an input disk-output disk, an input disk-input disk and an output disk-output disk, said plurality of tiltable rollers being configured for operatively coupling at least a part of the noncoaxial configuration of said plurality of input disks and said at least one output disk to transmit the torque therebetween;
    wherein, said toroidal transmission system is adapted to be operated by torque transmitted by at least one of said plurality of input disks to said at least one output disk;
    at least one of said plurality of input disks is adapted to be configured as said output disk; and
    said plurality of tiltable rollers are adapted to control the gear ratios between said adjacent disks such as to independently control the torque generated and transmitted by said adjacent disks.

2. The toroidal transmission system as claimed in claim 1, wherein said power source includes more than one power sources selected from internal combustion engine, electric motor, fuel cell, compressed air engine, high mass flywheel, and the like.

3. The toroidal transmission system as claimed in claim 1, wherein bevel gears are mounted on said plurality of input shafts between connecting shafts.

4. The toroidal transmission system as claimed in claim 1, wherein first clutch means are provided on each of said plurality of input shafts for selectively connecting said power source to said plurality of input disks.

5. The toroidal transmission system as claimed in claim 1, wherein second clutch means are provided on said at least one output shaft for selectively connecting said toroidal transmission system to said drive mechanism.

6. The toroidal transmission system as claimed in claim 5, wherein an auxiliary power source is provided in operative communication with said at least one output shaft subsequent to said second clutch means for transmitting additional torque to said at least one output shaft.

7. The toroidal transmission system as claimed in claim 5, wherein said second clutch means are provided on said at least one output shaft between said power source and said drive mechanism.

8. The toroidal transmission system as claimed in claim 1, wherein said drive mechanism is a differential arrangement.

9. The toroidal transmission system as claimed in claim 8, wherein said drive mechanism is provided in operative communication with at least one set of wheels from front wheels and rear wheels.

10. The toroidal transmission system as claimed in claim 9, wherein for an all-wheel drive at least one disk from said plurality of input disks and said at least one output disk is operatively connected to said front wheels and at least one disk from said plurality of input disks and said at least one output disk is operatively connected to said rear wheels.

\* \* \* \* \*